June 19, 1962 W. V. SMITH 3,039,313
LAWN MOWER BLADE BALANCE INDICATOR
Filed Dec. 9, 1958 3 Sheets-Sheet 1
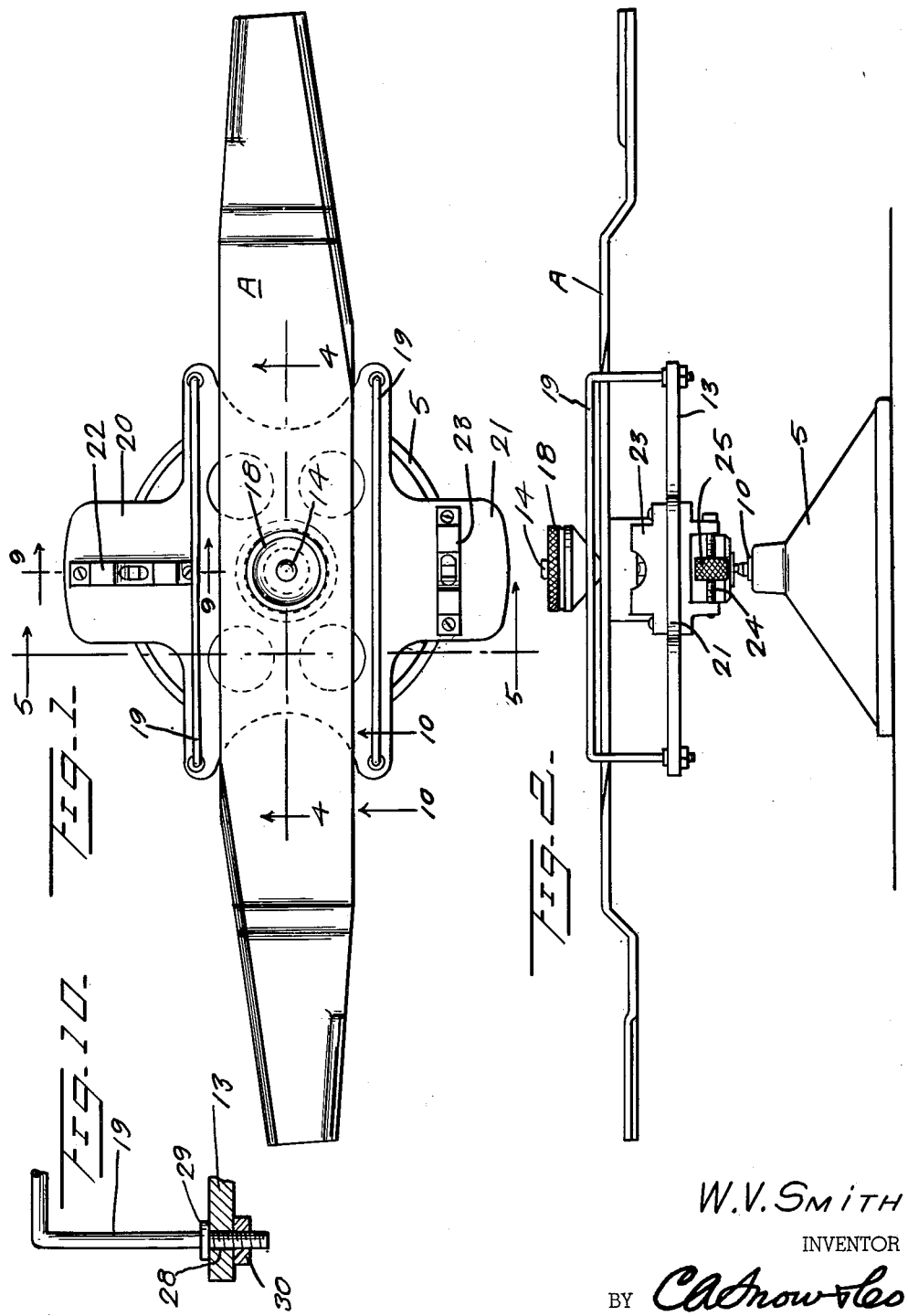
W.V. SMITH
INVENTOR
BY C.A. Snow & Co.
ATTORNEYS.

June 19, 1962   W. V. SMITH   3,039,313
LAWN MOWER BLADE BALANCE INDICATOR
Filed Dec. 9, 1958   3 Sheets-Sheet 2
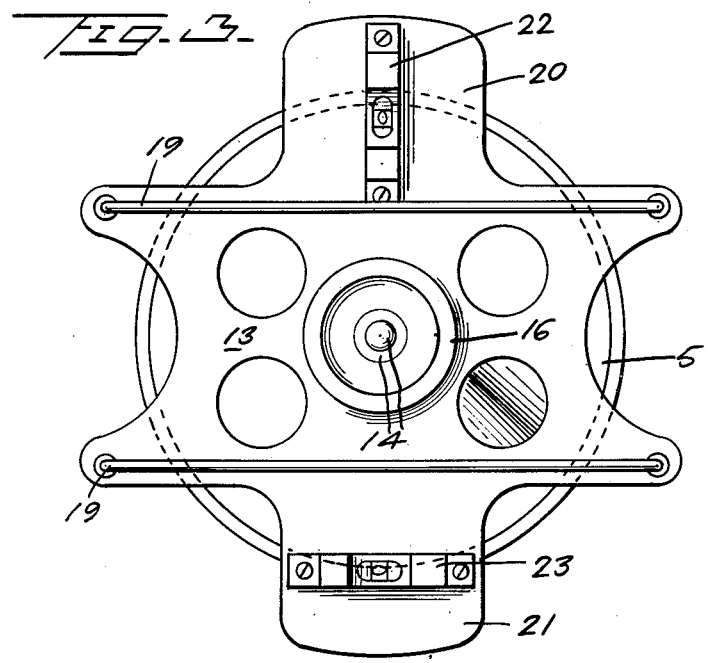
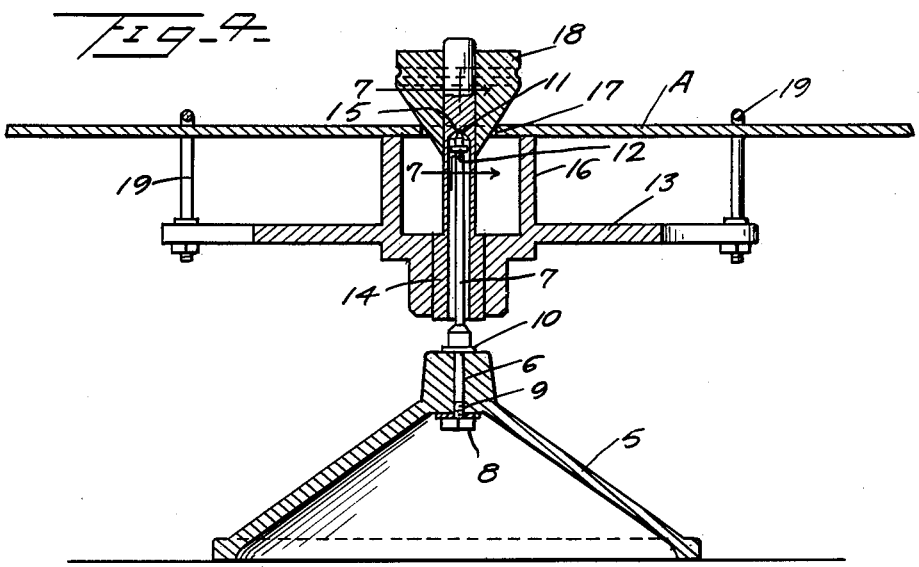
Wm. V. Smith
INVENTOR
BY
ATTORNEYS.

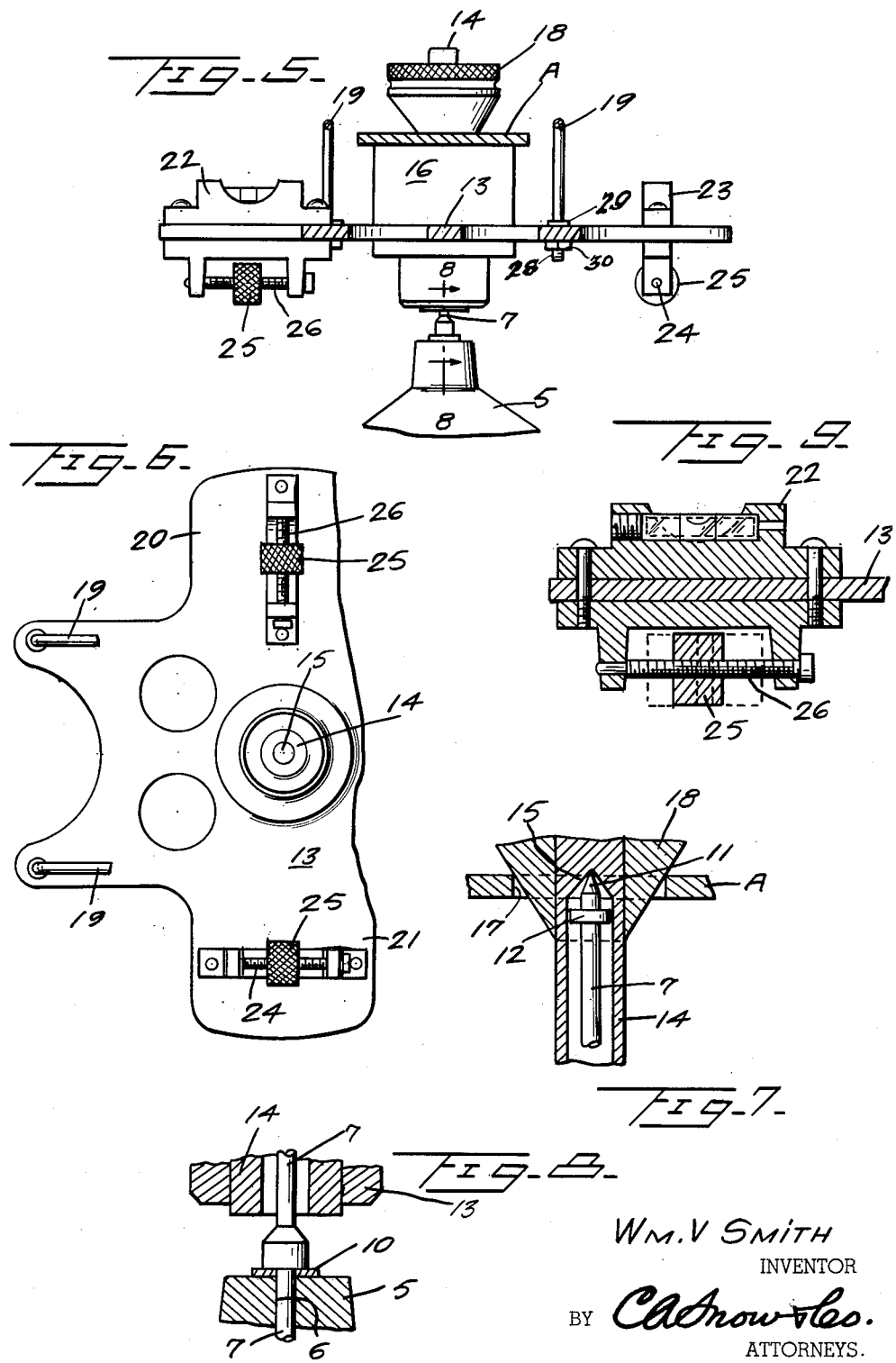

United States Patent Office 3,039,313
Patented June 19, 1962

3,039,313
LAWN MOWER BLADE BALANCE INDICATOR
William V. Smith, 801 W. Franklin St., Greenville, Ill.
Filed Dec. 9, 1958, Ser. No. 779,195
6 Claims. (Cl. 73—483)

By way of explanation, it might be stated that during the process of sharpening blades of mowers of the type wherein the blades rotate in horizontal planes, it is necessary to balance the blades and remove unbalance to insure an even distribution of the weight throughout the length of the blade to prevent pounding and vibrations which increase bearing wear caused by the centrifugal force developed as the result of a blade rotating rapidly during the mowing operation.

It is therefore the primary object of the invention to provide an apparatus on which a mower blade may be readily positioned to indicate any irregularity in the balance of the blade, which should be readily rectified during the sharpening operation.

An important object of the invention is to provide a balance indicating apparatus which will permit the blade being engaged to be readily placed thereon in such a way that an accurate reading of the balance of the blade will be insured.

A still further object of the invention is the provision of a stand having an exceptionally sensitive bearing for supporting the movable body of the apparatus, so that the slightest degree of variation or unbalance in the blade may be detected.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

FIGURE 1 is a plan view of the apparatus illustrating a mower blade mounted thereon.

FIGURE 2 is a side elevational view thereof.

FIGURE 3 is a plan view with the blade removed.

FIGURE 4 is a sectional view taken on line 4—4 of FIGURE 1.

FIGURE 5 is a sectional view taken on line 5—5 of FIGURE 1.

FIGURE 6 is a fragmental bottom view of the balancing table illustrating the adjustable weights mounted thereon.

FIGURE 7 is a sectional view taken on line 7—7 of FIGURE 4.

FIGURE 8 is a vertical sectional view taken on line 8—8 of FIGURE 5.

FIGURE 9 is a sectional view taken on line 9—9 of FIGURE 1.

FIGURE 10 is an elevational view of one end of a gauge rod.

Referring to the drawings in detail, the leveling or balancing device constituting the subject matter of the present invention, includes a base or pedestal 5, which is substantially cone shaped, as better shown by FIGURE 4 of the drawings, the pedestal being preferably hollow and provided with a bore 6 extending vertically through the apex of the base or pedestal 5.

Secured within the bore 6 is a bearing rod 7 which is substantially long and extends a substantial distance above the apex of the base, the bearing rod being secured in position by means of a nut 8 mounted on the threaded end 9 of the rod, the rod being also provided with an annular flange 10 that rests directly on the upper end of the apex of the base.

The upper end of the bearing rod 7 is conically pointed at 11, providing an exceptionally sensitive bearing point, the rod being provided with an annular flange 12 spaced from the pointed bearing 11, as shown by FIGURE 7 of the drawings.

The balancing table is indicated generally by the reference character 13, which table is formed with a sleeve 14 extending vertically through the axis thereof, the vertical sleeve 14 having a tapered bearing 15 formed adjacent to the upper end thereof, in which the conical end 11 of the bearing rod rests. It might be here stated that the annular flange 12 is of such a diameter that slight tilting movement of the vertical sleeve and balancing table supported thereby with respect to the bearing rod 7, will be permitted. Accordingly, it will be seen that this annular flange 12 also acts as a stop and maintains the balancing table in proper horizontal position by limiting the tilting movement of the sleeve 14.

Surrounding the vertical sleeve 14, and forming a part of the balancing table 13, there is an upstanding annular flange 16 which extends a substantial distance above the upper surface of the table 13, the upper edge of this upstanding annular flange providing a support for the mower blade being sharpened, which in the present showing is indicated by the reference character A.

The mower blade, being of a conventional structure, is provided with a shaft opening 17 which receives the vertical sleeve 14, the opening 17 of the blade A, being substantially larger in diameter than the outer diameter of the vertical sleeve so that the blade may be readily moved to center same on the support comprised by the upstanding annular flange 16.

The reference character 18 indicates an inverted cone shaped centering member which is so constructed that the tapered end or slant height thereof is a gradual slope terminating in a larger end, the gradual slope of the inverted cone shaped centering member contacting the edge of the opening 17 and centering the blade over the vertical sleeve 14.

Inverted U-shaped gauge rods 19 are mounted on the table 13 and are disposed in parallel spaced relation with respect to each other at opposite sides of the upstanding annular flange 16, these gauge rods being so constructed that the mower blade A which is mounted on the table for gauging and balancing, may be arranged with its longitudinal side edges parallel with the gauge rods thereby indicating the proper position of the blade on the table, for balancing purposes.

The gauge rods 19 are provided with annular flanges 29 adjacent to the threaded ends 28, which threaded ends extend through openings in the table 13 as shown by FIG. 10, the threaded ends 28 being secured in position by nuts 30.

The table 13 is formed with oppositely disposed offset portions or arms 20 and 21, which arms provide supports for the spirit levels 22 and 23, respectively, the spirit level 22 being disposed at right angles with respect to the spirit level 23, as best shown by FIGURE 3 of the drawings, so that while the spirit levels will register any unbalance of the table 13 indicating to the person sharpening the blade, where the blade should be filed or further ground to cause the blade to be properly balanced during the sharpening operation.

Mounted directly under the spirit level 23 and extending in parallel relation therewith, is a horizontal shaft 24 which is threaded throughout its length and accommodates the adjustable weight 25 which is formed with a threaded bore for receiving the threads of the shaft 24. Thus, it will be seen that by moving the weight 25 along the shaft 24 on which the weight is mounted, the table will be caused to tilt, thereby to level the table and cause the table and necessarily the blade A supported thereon to be properly balanced.

Directly under the spirit level 22, there is a shaft 26 which is threaded throughout its length, the shaft 26 being in parallel relation with the spirit level 22, as shown by FIG. 5 of the drawings. The shaft 26 also supports a weight formed with a threaded bore which weight is movable along the length of the shaft 26 to add moment to the table at the desired point to cause the proper balancing of the table and blade A supported thereon.

In operation the table 13 is levelled and the mower blade A is positioned on the upper surface of the upstanding annular flange 16. The shaft openings 17 are centered by the inverted cone shaped centering member 18.

It is obvious that if one end of the blade A is heavier than the other end, the balancing table 13 will tilt about one or both axes indicating such condition. The blade A is now removed and the heavy end thereof ground to remove a certain amount of metal to cause the blade to balance the table 13, which can be detected by observation of the spirit levels 22 and 23.

It will, of course, be understood that when positioning the mower blade A on the upper edge of the member 16, the longitudinal side edges of the blade will be held in alignment by the gauge rods 19 to insure proper positioning of the blade.

It will further be understood that when the inverted cone shaped centering member 18 is positioned as shown in FIGURE 4 of the drawings, the cone shaped surface of the member 18, will, by reason of its contact with the wall of the opening 17, cause the blade A to be centered on the upper edge of the upstanding annular flange 16, as best shown by FIGURE 4 of the drawings.

Having thus described the invention, what is claimed is:

1. A balance indicator for lawn mower blades comprising a pedestal, a vertical rod rising from said pedestal, a tiltable table mounted on said vertical rod for universal inclination with respect to a horizontal plane, said table having two arms on the opposite sides thereof, a spirit level mounted on one of said arms along the longitudinal center line of the latter and a spirit level mounted on the other of said arms at right angles to the longitudinal center line of the latter, adjustable weights mounted on said arms respectively movable in alignment with said spirit levels adapted to regulate the balance of said tiltable table, a vertically positioned annular flange formed on said tiltable table at the center of same, the upper surface of said flange providing a support for a mower blade to be balanced, a vertically positioned sleeve secured to said table surrounding and normally uniformly spaced from the vertical rod and extending through the center of said vertically positioned annular flange a substantial distance above the upper surface of said flange, said vertically positioned sleeve being adapted to extend through the shaft opening of the mower blade positioned on the table, and a cone shaped centering member slidable on the upper end of said sleeve and movable into said shaft opening of the mower blade and into contact with the wall of said opening for centering said blade on the tiltable table, and parallel gauge rods adapted to align with the marginal edges of the blade being balanced and positioned on the table parallel to the longitudinal center line of the spirit level on one of said arms and at right angles to the longitudinal center line of the spirit level on the other of said arms.

2. A balance indicator for lawn mower blades comprising a pedestal, a vertical rod rising from said pedestal having a conical upper end and a flange thereon adjacent the upper end, a tiltable table mounted on said rod for universal inclination with respect to a horizontal plane and having oppositely extending arms on its sides and a centrally positioned vertically extending flange thereon providing on its top a support for the mower blade being balanced, a spirit level mounted on one of said arms along the longitudinal center line of same and a spirit level mounted on the other of said arms at right angles to the longitudinal center line of the latter, adjustable weights mounted on said arms respectively movable in alignment with said spirit levels adapted to regulate the balance of said tiltable table, a vertically positioned sleeve secured to said table surrounding and normally uniformly spaced from the vertical rod and the flange thereon and having a closed upper end with an internal conical surface adapted to receive the conical upper end of the central rod and said sleeve extending through the center of said vertically positioned annular flange a substantial distance above the top of the latter and adapted to extend through the shaft opening of the mower blade positioned on the table, and a cone shaped centering member slidable on the upper end of said sleeve and movable into said shaft opening of the mower blade and into contact with the wall of said opening for centering said blade on the tiltable table.

3. A balance indicator for lawn mower blades comprising a pedestal, a vertical rod rising from said pedestal having a conical upper end and a flange thereon adjacent the upper end, a tiltable table mounted on said rod for universal inclination with respect to a horizontal plane and having a first pair of oppositely extending arms along a transverse axis and a second pair of oppositely extending arms along a longitudinal axis and an annular vertically extending flange at the intersection of said axes providing on its top a support for the mower blade being balanced, a spirit level mounted on one of said first arms along the transverse axis and a spirit level mounted on the other of said first arms at right angles to the transverse axis, a vertically positioned sleeve secured to said table surrounding and normally uniformly spaced from the vertical rod and the flange thereon and having a closed upper end with an internal conical surface adapted to receive the conical upper end of the central rod and said sleeve extending through the center of said vertically positioned annular flange a substantial distance above the top of the latter and adapted to extend through the shaft opening of the mower blade positioned on the top of the table, a cone shaped centering member slidable on the upper end of said sleeve and movable into said shaft opening of the mower blade and into contact with the wall of said opening for centering said blade on the tiltable table and parallel gauge rods along the sides of said second pair of arms parallel to the longitudinal center line of the table and positioned above the top of the annular flange.

4. A balance indicator for lawn mower blades comprising a pedestal, a vertical rod rising from said pedestal having a conical upper end and a flange thereon adjacent the upper end, a tiltable table mounted on said rod for universal inclination with respect to a horizontal plane and having oppositely extending arms along a transverse axis and oppositely extending arms along a longitudinal axis and an annular vertically extending flange at the intersection of said axes providing on its top a support for the mower blade being balanced, a spirit level mounted on one of said first arms along the transverse axis and a spirit level mounted on the other of said first arms at right angles to the transverse axis, adjustable weights mounted on said first arms respectively movable in alignment with said spirit levels adapted to regulate the balance of said tiltable table, a vertically positioned sleeve secured to said table surrounding and normally uniformly spaced from the vertical rod and the flange thereon and having a closed upper end with an internal conical surface adapted to receive the conical upper end of the central rod and said sleeve extending through the center of said vertically positioned annular flange a substantial distance above the top of the latter and adapted to extend through the shaft opening of the mower blade positioned on the top of the table, a cone shaped centering member slidable on the upper end of said sleeve and movable into said shaft opening of the mower blade and into contact with the wall of said opening for centering said blade on the tiltable table and parallel gauge rods along the sides of said second pair of arms parallel to the longitudinal center line of the table and positioned above the top of the annular flange.

5. A balance indicator for lawn mower blades comprising a pedestal, a tiltable table mounted above said pedestal for universal inclination with respect to a horizontal plane and having two oppositely extending arms on its sides and a centrally positioned vertically extending flange thereon providing on its top a support for the mower blade being balanced, a vertical rod rising from said pedestal and having a conical upper end and a flange thereon adjacent the upper end positioned at approximately the level of the top of the vertically extending flange, a vertically positioned sleeve secured to said table surrounding and normally uniformly spaced from the vertical rod and the flange thereon and having a closed upper end with an internal conical surface adapted to receive the conical upper end of said central rod and said sleeve extending through the center of said vertically positioned annular flange a substantial distance above the top of the latter and adapted to extend through the shaft opening of the mower blade positioned on the table, a cone shaped centering member slidable on the upper end of said sleeve and movable into said shaft opening of the mower blade into contact with the wall of said opening for centering the blade on the tiltable table, a spirit level mounted on one of the arm on the table along the longitudinal center line of the arms and a spirit level on the other of said arms at right angles to the center line of the arm.

6. A balance indicator for lawn mower blades comprising a pedestal, a tiltable table mounted above said pedestal for universal inclination with respect to a horizontal plane, and having two oppositely extending arms on its sides and a centrally positioned vertically extending flange thereon providing on its top a support for the mower blade being balanced, a vertical rod rising from said pedestal and having a conical upper end and a flange thereon adjacent the upper end positioned at approximately the level of the top of the vertically extending flange, a vertically positioned sleeve secured to said table surrounding and normally uniformly spaced from the vertical rod and the flange thereon and having a closed upper end with an internal conical surface adapted to receive the conical upper end of said central rod and said sleeve extending through the center of said vertically positioned annular flange a substantial distance above the top of the latter and adapted to extend through the shaft opening of the mower blade positioned on the table, a cone shaped centering member slidable on the upper end of said sleeve and movable into said shaft opening of the mower blade and into contact with the wall of said opening for centering the blade on the tiltable table, a spirit level mounted on one of the arms on the table along the longitudinal center line of the arm and a spirit level mounted on the other of said arms at right angles to the longitudinal center line of the arm, and adjustable weights mounted on said arms movable in alignment with said spirit levels adapted to regulate the balance of said tiltable table.

References Cited in the file of this patent
UNITED STATES PATENTS

| | | |
|---|---|---|
| 2,075,421 | Bennett | Mar. 30, 1937 |
| 2,176,269 | Morse | Oct. 17, 1939 |
| 2,193,628 | Hem | Mar. 12, 1940 |
| 2,214,758 | Bell | Sept. 17, 1940 |
| 2,301,958 | Lannen | Nov. 17, 1942 |
| 2,308,950 | Hulslander | Jan. 19, 1943 |
| 2,388,705 | Reiber | Nov. 13, 1945 |
| 2,502,633 | Shepard | Apr. 4, 1950 |
| 2,592,804 | Holl | Apr. 15, 1952 |
| 2,803,964 | Smith | Aug. 27, 1957 |

FOREIGN PATENTS

| | | |
|---|---|---|
| 731,459 | Great Britain | June 8, 1955 |